Oct. 3, 1967 A. F. PADDOCK ET AL 3,345,542

MULTIPLE STATION PROTECTOR

Filed Aug. 15, 1966 5 Sheets-Sheet 1

INVENTORS
ALVIN. F. PADDOCK,
FRANK C. SUMMERS.

Oct. 3, 1967 A. F. PADDOCK ET AL 3,345,542

MULTIPLE STATION PROTECTOR

Filed Aug. 15, 1966

5 Sheets-Sheet 4

Oct. 3, 1967 A. F. PADDOCK ET AL 3,345,542

MULTIPLE STATION PROTECTOR

Filed Aug. 15, 1966 5 Sheets-Sheet 5

United States Patent Office 3,345,542

Patented Oct. 3, 1967

3,345,542

MULTIPLE STATION PROTECTOR

Alvin F. Paddock, Roselle, and Frank C. Summers, Chicago, Ill., assignors to Cook Electric Company, Morton Grove, Ill., a corporation of Delaware Filed Aug. 15, 1966, Ser. No. 572,263
4 Claims. (Cl. 317—116)

ABSTRACT OF THE DISCLOSURE

A communications circuit protector in which one or more integral communications circuit protector modules are separately removably supported by an elongated ground conductor strap. A single conductive mounting screw holds the module against the conductive strap and electrically connects the module to the strap. The module has two intersecting linear grooves in its insulative base for engaging opposing sides of the ground conductor strap, preventing rotation between the module and the ground conductor strap and providing alternative mounting positions of the module.

The invention relates to an improved communications circuit protector.

It is an object of the invention to provide a communications circuit protector with improved installation convenience and flexibility.

It is another object of the invention to provide a communications circuit protector arrangement with improved installation flexibility and lower cost having a multiple independent module arrangement whereby the amount of installed protector capacity may be easily increased or decreased to correspond to the existing circuit requirements, which arrangement is particularly advantageous for multiple unit dwellings and multiline commercial installations.

It is a further object of the invention to provide a telephone circuit protection arrangement which provides overvoltage protection for each line pair in a multiple line installation with minimum installed equipment and cost, yet with improved capacity for increasing the number of lines handled at a given installation.

It is a more specific object of the invention to provide a communications circuit protector in which a compact module including a self-contained overvoltage protection circuit is adapted to be mounted to a ground conductor strap by a single fastening means which provides both the electrical ground and mechanical connection of the module to the conductor strap.

It is an additional specific object of the invention to provide a communications circuit protector module adapted to provide alternative mounting positions of said module to a ground conductor strap by a single fastening means.

Further objects and advantages of the present invention will appear from the following description, taken with the accompanying drawings, in which.

Figure 12:
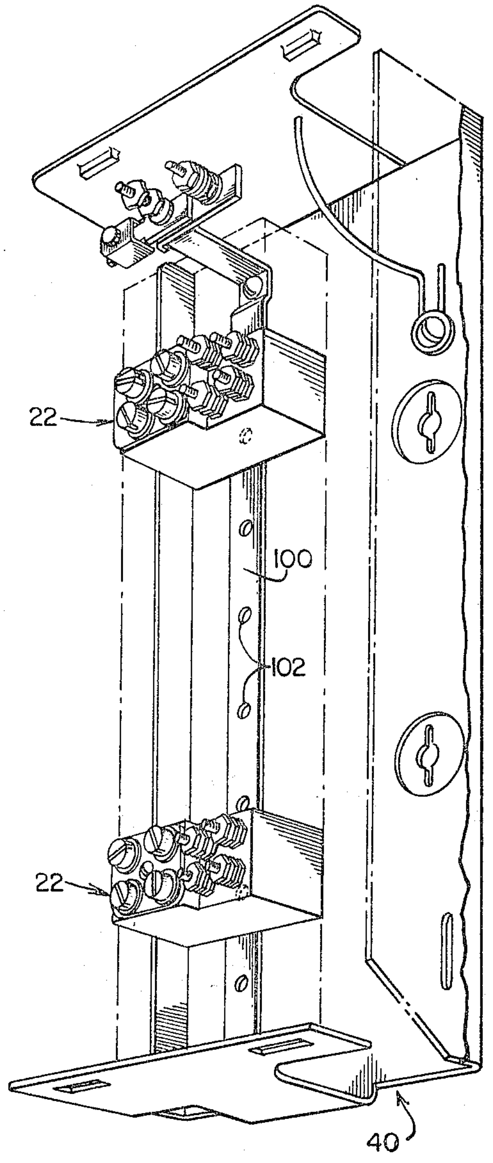
Figure 11:
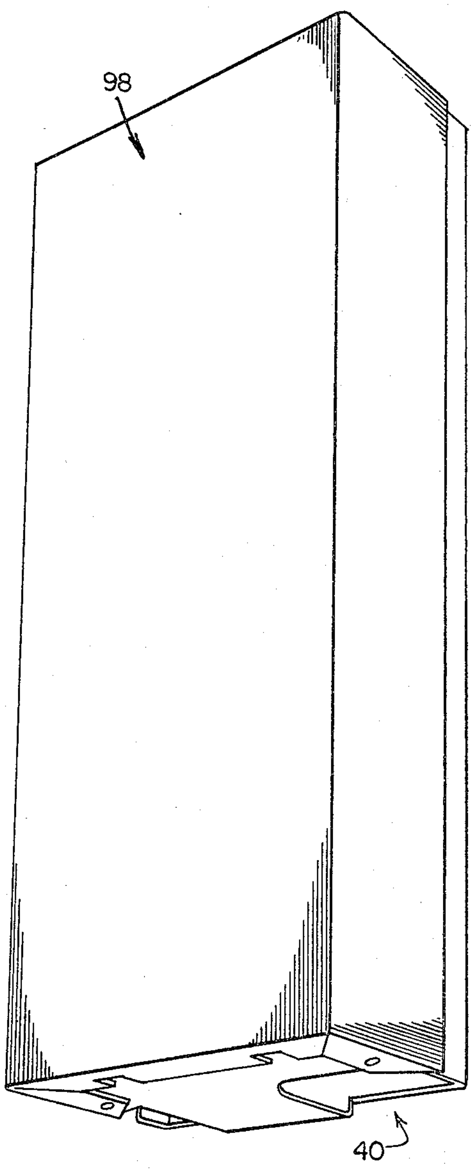
FIGURE 11 is a perspective view of another embodiment of the communications circuit protector of FIGURE 1.

and FIGURE 12 is a perspective view of the embodiment of FIGURE 11 with the cover thereof removed.

Turning now to the drawings, there is illustrated in FIGURES 1–4 an exemplary communications circuit protector 20 in accordance with the present invention. It includes a circuit protector module 22 electrically and mechanically removably connected to a ground conductor strap 24 by a single fastening member 26. FIGURES 5–10 illustrate another communications circuit protector embodiment 30. The communications circuit protector 30 is adapted to contain a plurality of the same circuit protector modules 22 secured to a similar ground conductor strap 34 within a weather protective enclosure 80 suitable for outdoor installation. FIGURES 11–12 illustrate another communications circuit protector embodiment 40 having an elongate enclosure or housing 98 intended to be secured to an indoor wall or building surface.

Considering now in detail the circuit protector module 22, it is preferably employed with all three of the communications circuit protectors 20, 30 and 40. Each module 22 is a completely self-contained integral unit adapted to provide overvoltage protection to two pairs of telephone lines. All components of the module are preferably internal of or mounted upon an insulative base 44. The insulative base 44 may be molded of phenolic or other suitable material. The complete module 22 preferably has a small generally rectangularly prismatical configuration. Suitable exemplary dimensions are 2⅞ inches long by 1½ inches wide by 1¼ inches high.

The electrical function of the circuit protector module 22 is to provide protection to each line pair from voltage overload conditions. To these ends, there are provided four similar exposed line terminals 46, each of which connects individually with one of four similar removable telephone circuit overvoltage protectors 48. The overvoltage protectors 48 are preferably of a known and accepted type and need not be described herein. As illustrated in cross-section in FIGURE 4, they are preferably of the type providing an air gap for grounding overvoltage surges and having a fusible disk for protection against powerline cross or other extended voltage overload by permanently grounding the line to the shell of the overvoltage protector and thereby to ground.

Figure 4:
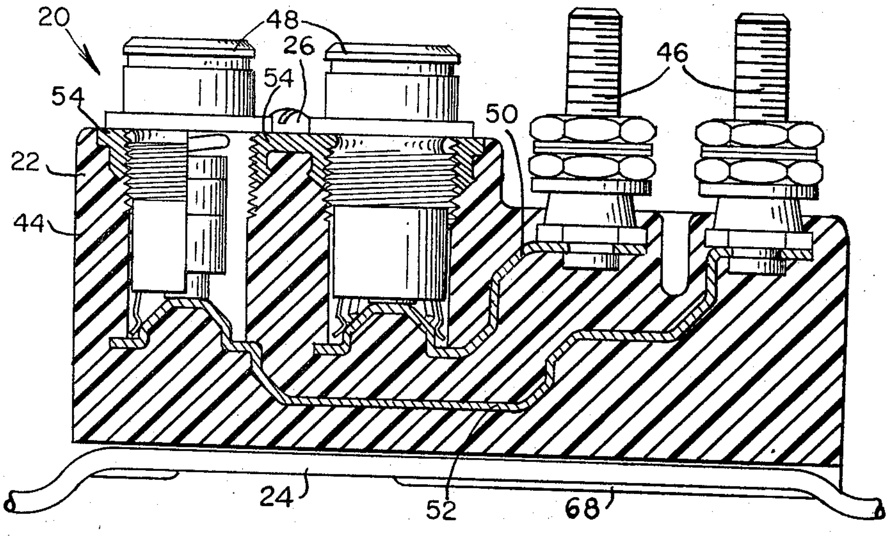
FIGURE 4 is a cross-sectional view of the embodiment of FIGURE 1 along line 4—4 in FIGURE 1.

Referring particularly to FIGURE 4, it may be seen that there are preferably provided completely internal connectors 50 or 52 between each line terminal 46 and its overvoltage protector 48. Both connectors extend lengthwise along the long dimension of the module. A connector 50 at each side of the module connects the inner line terminal 46 on that side with the inner overvoltage protector 48 on that side. Correspondingly, a connector 52 at each side of the module runs underneath the connector 50 to connect the outer line terminal 46 at that side with the outer overvoltage 48 on that side. Thus, here the two line terminals 46 and the two overvoltage protectors 48 with which they connect are in alignment.

All of the overvoltage protectors 48 are preferably located at one end of the module and preferably threadably mount by their conductive shells into a common ground plate 54 on the module. Thus, the ground plate 54 provides a common ground conductor connecting all of the overvoltage protectors. The ground plate 54 may be of copper alloy or other suitable conductor material molded flush into the insulative base 44. Preferably, it defines the upper planar surface of the module in the area occupied by the spaced overvoltage protectors. Preferably, there is a substantial exposed surface area of the ground plate 54 at its center intermediate the overvoltage protectors.

The line terminals 46 may be threaded conductive studs as shown here or suitable wire connection terminals. Although the line terminals 46 are relatively closely spaced apart on the compact module 22, substantial electrical isolation is provided therebetween by means of the configuration of the insulative base 44. Specifically, a deep longitudinal central channel 56 extends from the upper surface of the module most of the way down into the insulative base to provide a long surface path, and therefore isolation, between the line terminal pairs at the opposite sides of the module. Correspondingly, a transverse channel 58 in the base 44 provides an extended surface path between the two line terminals 44 at each side.

Figure 1:
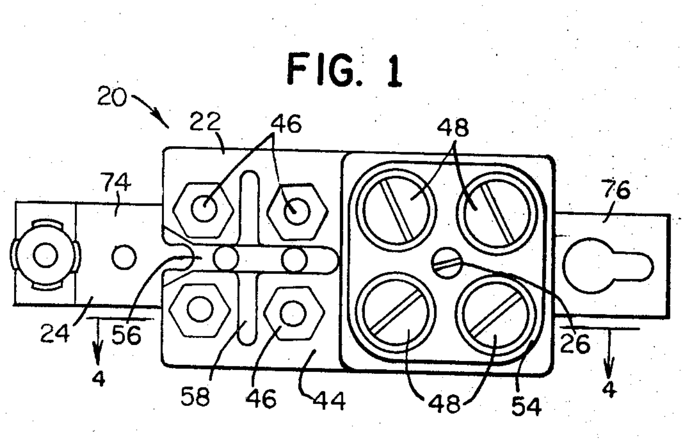
FIGURE 1 is a plan view to scale of a communications circuit protector to be described as an illustrative embodiment of the present invention.
Figure 2:
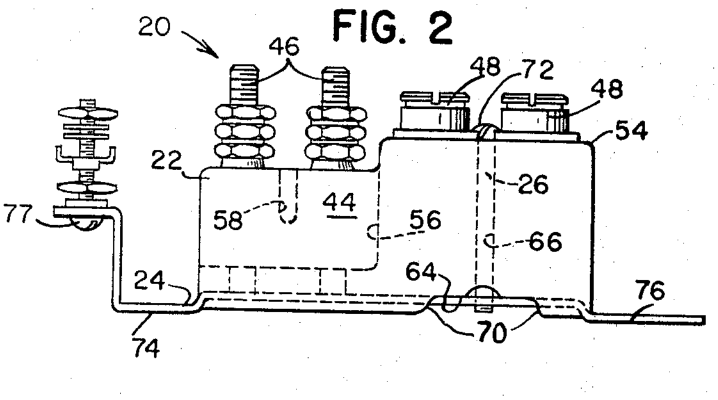
FIGURE 2 is a side view of the embodiment of FIGURE 1.
Figure 3:
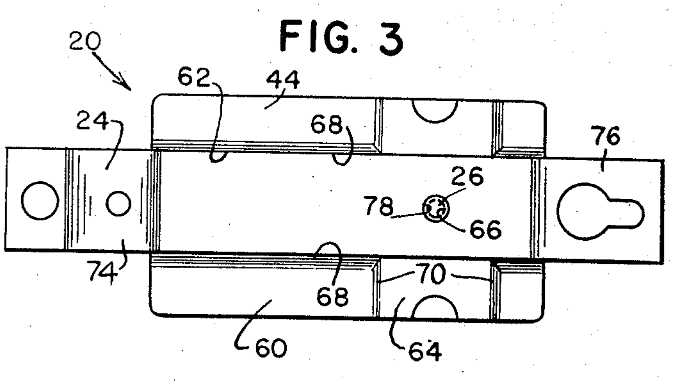
FIGURE 3 is a bottom view of the embodiment of FIGURE 1.

Considering now particularly the bottom surface of the protector module 22, as shown in FIGURE 3, this surface is generally planar and rectangular. Preferably, there are no substantial apertures or exposed conductive surfaces on the insulative base 44 over this area. The entire bottom surface defines a mounting side 60 for the module.

The mounting side 60 is specifically adapted, preferably by integral molding of the insulative base 44, to engage a ground conductor strap. To these ends, there is preferably provided a longitudinal recess or groove 62 extending centrally across the entire length or elongate dimension of the mounting side 60. This longitudinal recess 62 is preferably a planar channel having a width approximately equal to and slightly larger than the width of the ground conductor strap and having a depth into the surface of the mounting side 60 somewhat greater than the thickness of the ground conductor strap. Additionally, there is preferably provided a transverse recess or groove 64 which is substantially identical to the longitudinal recess 62 except that it extends across the width of the mounting side 60, preferably centrally under the ground plate 54. Thus, the transverse recess 64 crosses and is at right angles to the longitudinal recess 62. It may be seen that the edges of both the longitudinal and transverse recesses 62 and 64, at the transition from the principal surface of the mounting side 60 to the recesses, define opposing pairs of spaced shoulders 68 and 70 respectively spaced apart by the width of the recesses.

At the center of the area of intersection of the two recesses 62 and 64 midwidth of both recesses is the lower opening of a passageway 66. The passageway 66 extends from the surface of the mounting side 60 up through the insulative base 44 and through the center of the ground plate 54 where it has an upper opening. The passageway 66 thus provides a generally cylindrical aperture extending vertically through the entire module 22. It is adapted to receive therethrough the fastening member 26.

The entire circuit protector module 22 is preferably held to a ground conductor strap by a single fastening member 26. The fastening member 26 provides rapid installation and removability of the module from the ground conductor strap without special tools. Further, the fastening member 26, in addition to providing the sole mechanical attachment of the module to the conductor strap, is the electrical ground connection and circuit between the module ground circuit and the ground conductor strap.

The preferred fastening member 26 is a copper or brass threaded screw having a sufficient length to extend completely through the passageway 66 in the module 22. The head 72 of the fastening member 26 preferably has a flat base and is adapted to abut the upper surface of the ground plate 54 so as to make both an electrical and mechanical connection therewith or with a washer therebetween. The threaded shaft of the fastening member 26 is preferably freely slideably insertable through the passageway 66.

Considering now the ground conductor strap, this member is preferably adapted to provide the sole mechanical support for one or more modules 22 and to engage, as described above, within the longitudinal recess 62 or the transverse recess 64 in the mounting side 60 of the module. It will be appreciated that the length of the ground conductor strap will vary in accordance with the maximum number of modules which it is designed to have secured thereto. The embodiment of FIGURES 1–4 shows a ground conductor strap 24 adapted to have a single module 22 mounted thereto, whereas the ground conductor strap 34 in the embodiment of FIGURES 5–10 is adapted to mount three modules, and the embodiment of FIGURES 11–12 is adapted to mount nine modules. Various communications circuit protectors may be designed with various maximum line capacities by increasing the length of the ground conductor strap.

Preferably, the ground conductor strap is of copper alloy or other suitable conductive material, and suitable dimensions are, for example, ¾ inch wide by .065 inch thick. As previously mentioned, the width and thickness of the ground conductor strap generally corresponds to the width and depth of the recesses 62 and 64 in the base of the module. Preferably, however, the thickness of the ground conductor strap is somewhat less than the depth of the recesses 62 and 64 so that, when the module is mounted in position, the surface of the ground conductor strap is recessed below the general surface of the mounting side 60.

Referring specifically to the ground conductor strap 24 of the embodiment of FIGURES 1–4, it may be seen that the central portion of this ground conductor strap 24 is in a plane raised somewhat above the plane of end portions 74 and 76 thereof to allow it to recess into the longitudinal recess 62. The end portions 74 and 76 contain mounting apertures by which the ground conductor strap 24 may be flushly mounted to any appropriate surface by conventional fastening means and thereby provide a completely self-contained communications circuit protector without any additional housing or associated equipment and suitable for any indoor or sheltered installation. The end portion 74 preferably has a conventional type of ground stud 77 providing a ground terminal connection.

Located at an intermediate position on the ground conductor strap 24 centrally of its width is the threaded hole 78 of, for example, $\frac{5}{32}$ inch diameter. The threaded hole 78 is adapted to be perpendicularly engaged by the fastening member 26.

It may be seen that the engagement of the fastening member 26 through the threaded hole 78 pulls the module 22 tightly against the ground conductor strap 24. Preferably, the module 22 is mounted with the longitudinal recess 62 over the ground conductor strap 24 rather than the transverse recess 64, although the latter could be employed if desired. The conductor strap 24 is thus retained between the shoulders 68 of the longitudinal recess 62. The shoulder 68 abuts the edges of the conductor strap 24 and provides rotation of the module 22 with respect to the conductor strap both during mounting and after the mounting is accomplished.

Considering now the communications circuit protector 30, it will be seen that this circuit varies from the communications circuit protector 20 primarily in that it has a weather protective enclosure 80, which enclosure includes a housing or base portion 82 and a removable cover portion 84. Thus, the communications circuit protector 30 is particularly adapted for outdoor installations.

Considering specific differences between the protector 30 and the protector 20, it will be seen that the protector 30 contains a ground conductor strap 34 mounted within the enclosure 80 to the housing portion 82. This conductor strap 34 contains a plurality of spaced apertures 86 corresponding to the threaded hole 78 in the conductor strap 24. These apertures 86 are spaced apart by a distance substantially equal to and slightly greater than the width of a circuit protector module 22. In this particular embodiment, three such apertures 86 are provided, and the enclosure is adapted to hold up to three circuit protector modules.

It may be seen that the enclosure itself is a relatively simple structure which may be produced with relatively little expense because it does not contain any electrical components other than the ground conductor strap 34 and a common ground stud 88 therefor. All of the protector circuitry is in the modules 22 which are installed only as actually needed to protect installed lines.

Figure 7:
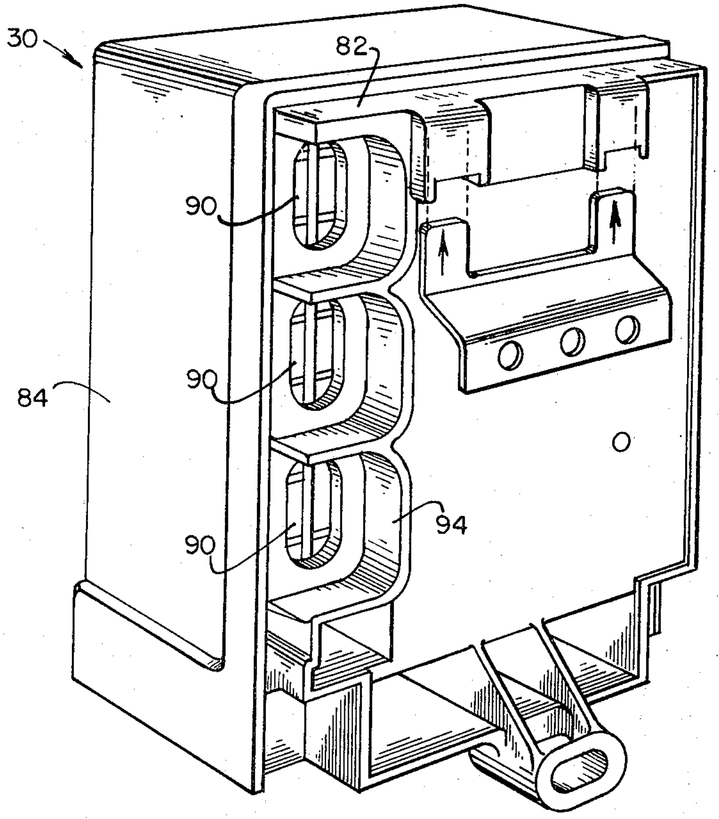
FIGURE 7 is a perspective rear view of the embodiment of FIGURE 5.
Figure 5:
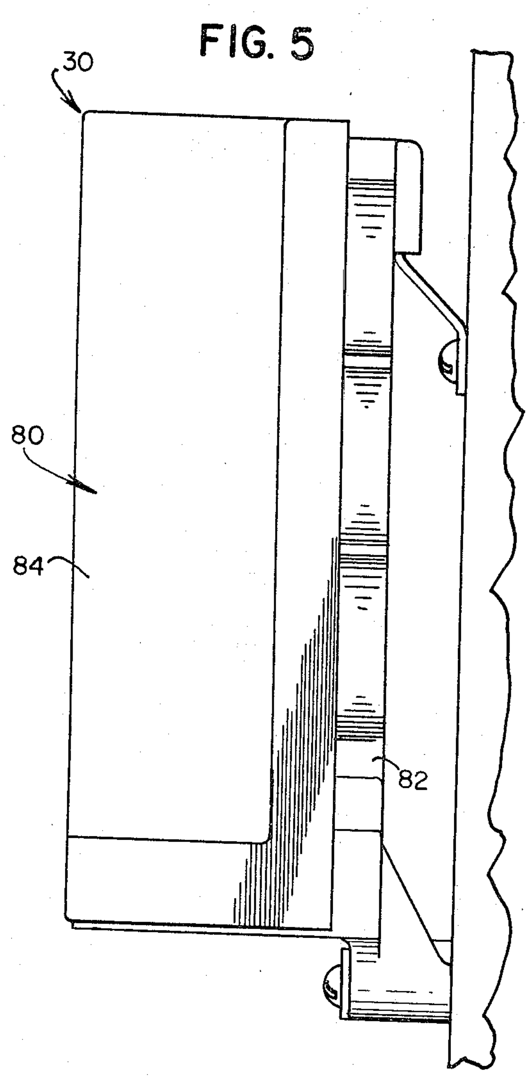
FIGURE 5 is a side view of another embodiment of the communications circuit protector of FIGURE 1.
Figure 6:
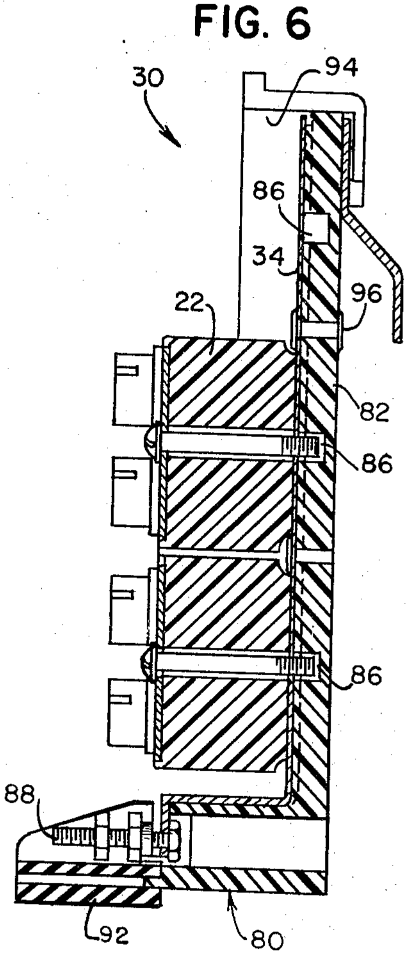
FIGURE 6 is a cross-sectional view of the embodiment of FIGURE 5 taken along the line 6—6 in FIGURE 8.
Figure 8:
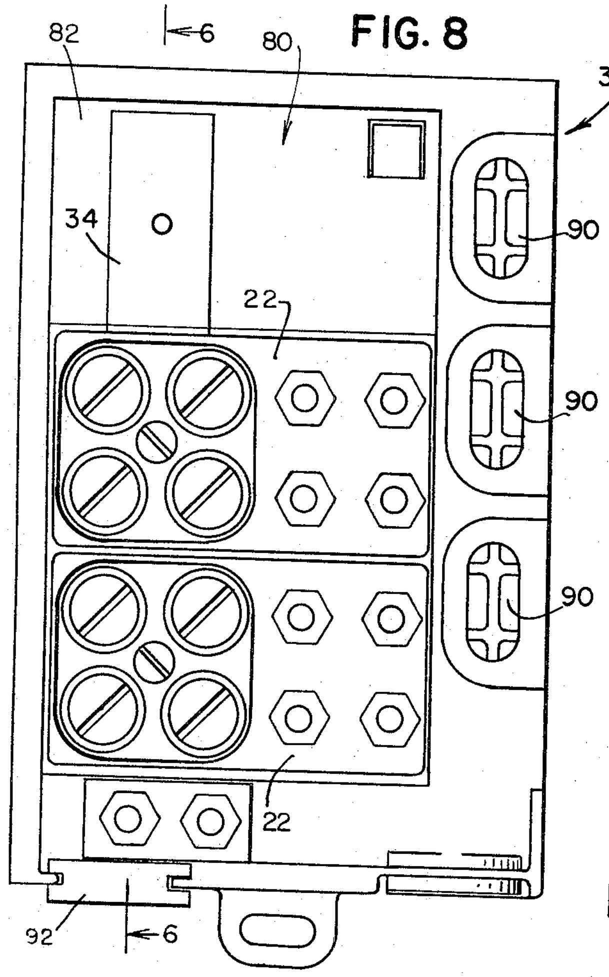
FIGURE 8 is a plan view of the embodiment of FIGURE 5 with the cover thereof removed.
Figure 9:
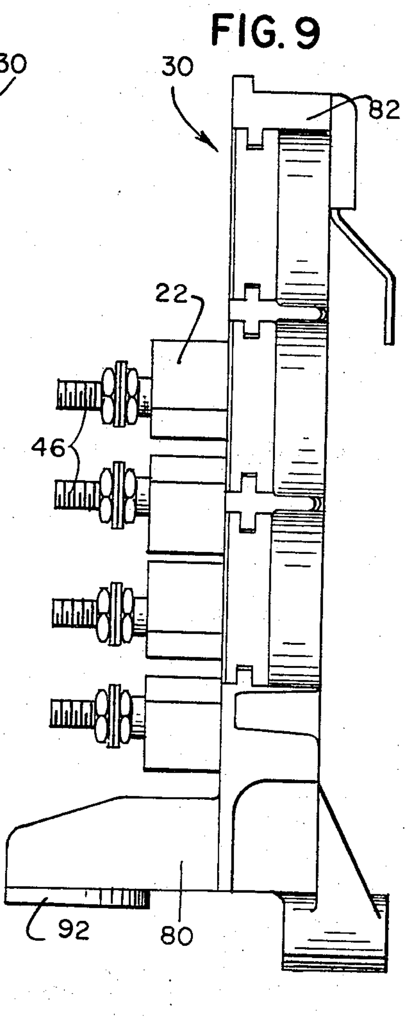
FIGURE 9 is a side view of the embodiment of FIGURE 5 with the cover thereof removed.
Figure 10:
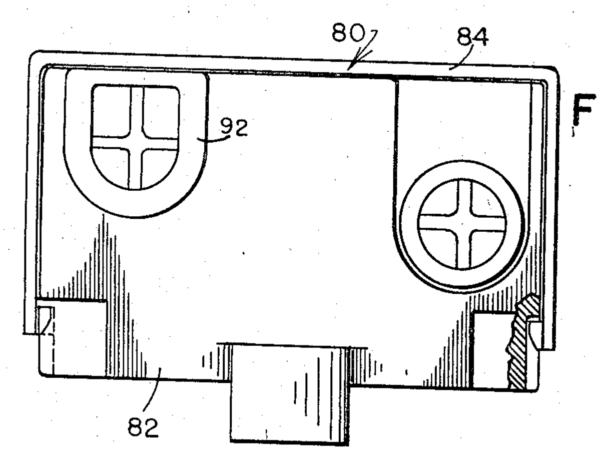
FIGURE 10 is a front view of the embodiment of FIGURE 5.

As particularly shown in FIGURES 5–7, the housing 82 is provided with means for readily mounting the enclosure to a suitable surface. Also, as shown in FIGURES 7–8, there is preferably provided a plurality of line grommets or bushings 90 spaced along one edge of the housing 82 and corresponding in number to the maximum number of modules 22 to be accommodated. Thus, the lines to each module may be handled through separate grommets. An additional grommet 92 in the front wall of the housing 82 is provided for the ground lead to the ground stud 88.

The housing 82 also includes means for positioning the modules therein. Preferably, the entire housing 82 is molded from phenolic or other suitable material with a recessed section 94 proportioned to contain the modules therein. The ground conductor strap 34 may be secured within this recessed section 94 by rivets 96 or other suitable means. The surface of the housing 82 directly underlying the ground conductor strap 34 is slightly raised above the remaining planar surface of the recessed section 94. Accordingly, the ground conductor strap is spaced above the adjacent surface of the recessed section 94. This allows the modules to be mounted generally upon the surface of the recessed section 94, yet have the conductor strap 34 extend up into the transverse recess 64, so that each module 22 is secured in the same manner as described for the communications circuit protector 20. The recessed section 94 corresponds in width to the length of the modules so that the modules are positioned by the edges of the recessed section 94 upon insertion with respect to the ground conductor strap 34.

Considering now the embodiment of FIGURES 11–12, there is shown therein a communications circuit protector 40 particularly adapted for indoor installations and having a capacity for handling a large number of line pairs. The communications circuit protector 40 comprises an inexpensive and simple enclosure 98 of steel or other suitable material. The enclosure 98 is basically a bare container adapted to receive the modules 22. The only electrical component preferably provided therein is an elongate ground strap 100.

The ground conductor strap 100 is constructed so that the principal portion thereof adapted to receive the modules 22 is spaced slightly above the inside rear surface of the enclosure 98. Threaded apertures 102 are provided through the ground conductor strap 100 spaced apart by a distance slightly greater than a dimension of the modules 22.

It will be appreciated that various communications circuit protectors in accordance with the present invention may be constructed other than those described hereinabove. For example, such protectors may be provided as underground pedestal installations or large panel units for large apartment or commercial buildings, etc. The circuit protector arrangement of the invention is particularly suitable for any installation in which the number of lines to be protected are subject to variation. Substantial cost savings are provided over the present practice of installing an integral multiple line unit having a fixed number of overvoltage protectors. Further, in such present units, the line capacity cannot be increased beyond the fixed number the installation provided for, and a complete new multiple line unit must be added when the capacity is exceeded. In contrast, with the presently disclosed arrangements, the number of modules is simply increased as the number of lines is increased, and there is no idle or unused installed equipment.

It may be seen that there has been provided by the invention described herein a new and improved communications circuit protector. It is anticipated that various modifications and improvements may be made therein by those skilled in the art, and it is intended to encompass in the accompanying claims all such modifications and improvements as fall within the true spirit and scope of the invention.

What is claimed is:

1. A communications circuit protector comprising:
at least one self-containing integral communications circuit protector module;
each said module having an insulative base and containing an integral communications overvoltage protection circuit on said base,
said overvoltage protection circuit including at least one pair of overvoltage protector means, communications circuit terminal means connecting with said overvoltage protector means, and a common ground conductor on said base connecting said overvoltage protector means;
an elongated ground conductor strap;
each said module being independently removably mounted to said ground conductor strap,
said base of each said module having a mounting side abutting said ground conductor strap,
said mounting side having a set of opposing spaced projecting shoulders thereon engaging opposing sides of said ground conductor strap preventing rotation between said module and said ground conductor strap;
and a single conductive fastening means fastened to said common ground conductor of said module and to said ground conductor strap removably holding said mounting side of said base against said ground conductor strap,
said fastening means electrically connecting said common ground conductor on said base with said ground conductor strap,
said fastening means and said shoulders together providing the complete rigid mechanical connection of each said module to said ground conductor strap,
said ground conductor strap providing a complete mechanical support of each said module.

2. The communications circuit protector of claim 1 wherein said fastening means comprises a single threaded conductive mounting screw extending through said insulative base and projecting beyond said mounting side, said mounting screw having a head engaging said common ground conductor, and wherein said ground conductor strap has means for supporting a plurality of said modules comprising a plurality of threaded apertures each adapted to engage one said mounting screw, said apertures being spaced apart a distance substantially equal to a dimension of said module.

3. The communications circuit protector of claim 1 wherein said mounting side of said base has two sets of opposing spaced shoulders thereon, which two sets are at an angle to one another to provide two alternative mounting positions of said base to said ground conductor strap.

4. The communications circuit protector of claim 3 wherein said two sets of spaced shoulders are defined by two intersecting linear grooves each extending across said mounting side of said base, each said groove having a planar surface and a width substantially equal to the width of said ground conductor strap, and said fastening means projects from said mounting side centrally of the intersection of said grooves.

References Cited

UNITED STATES PATENTS

| | | | |
|---|---|---|---|
| 1,687,319 | 10/1928 | Benzon | 317—119 |
| 2,644,143 | 6/1953 | Ballou | 200—133 X |

ROBERT K. SCHAEFER, *Primary Examiner.*

M. GINSBURG, *Assistant Examiner.*